Jan. 5, 1932.   P. A. KINZIE ET AL   1,840,205
FLUID HANDLING AND CONTROLLING APPARATUS
Filed Aug. 11, 1928   9 Sheets-Sheet 1
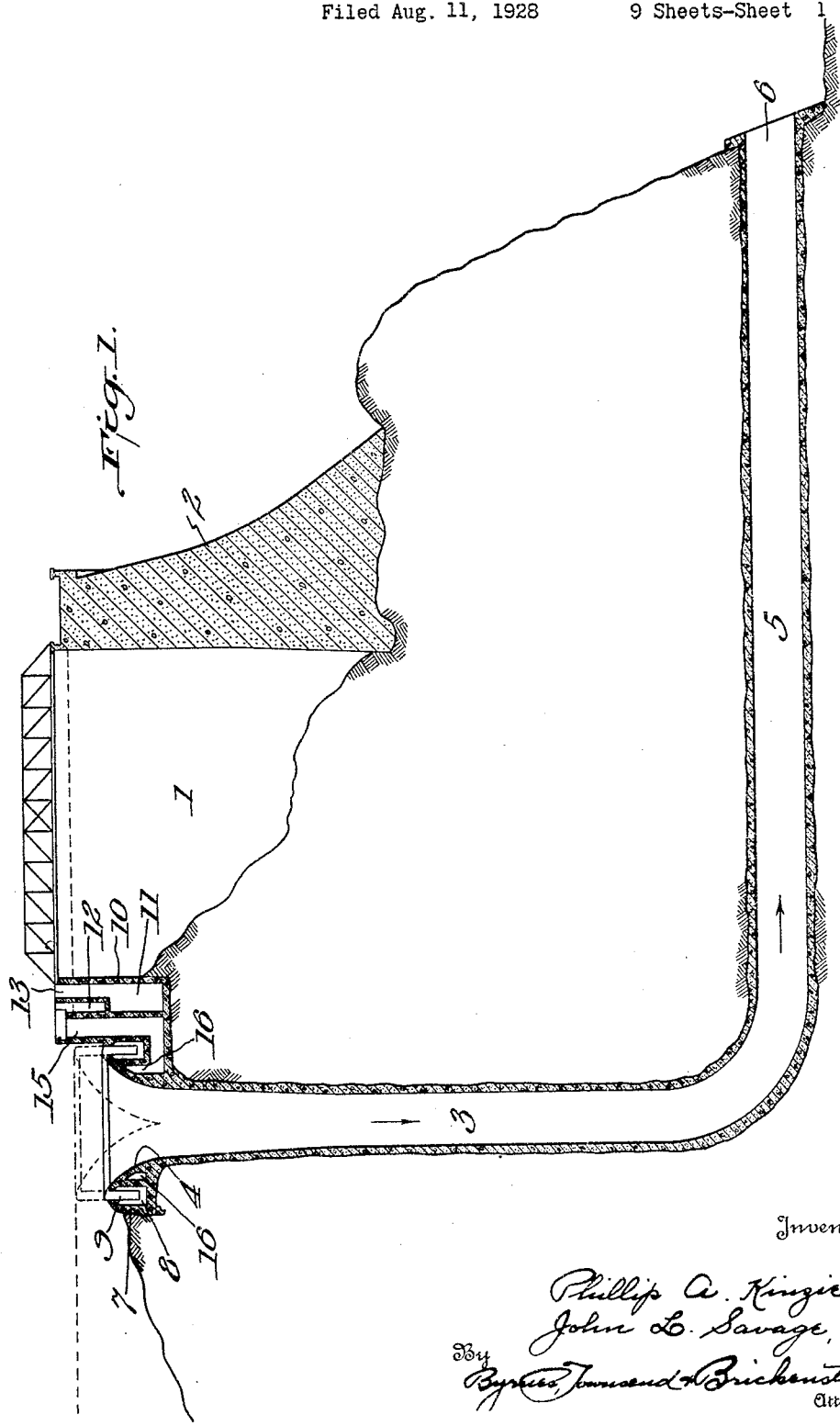
Inventors:
Phillip A. Kinzie,
John L. Savage,
By Byrnes Townsend & Brickenstein,
Attorneys

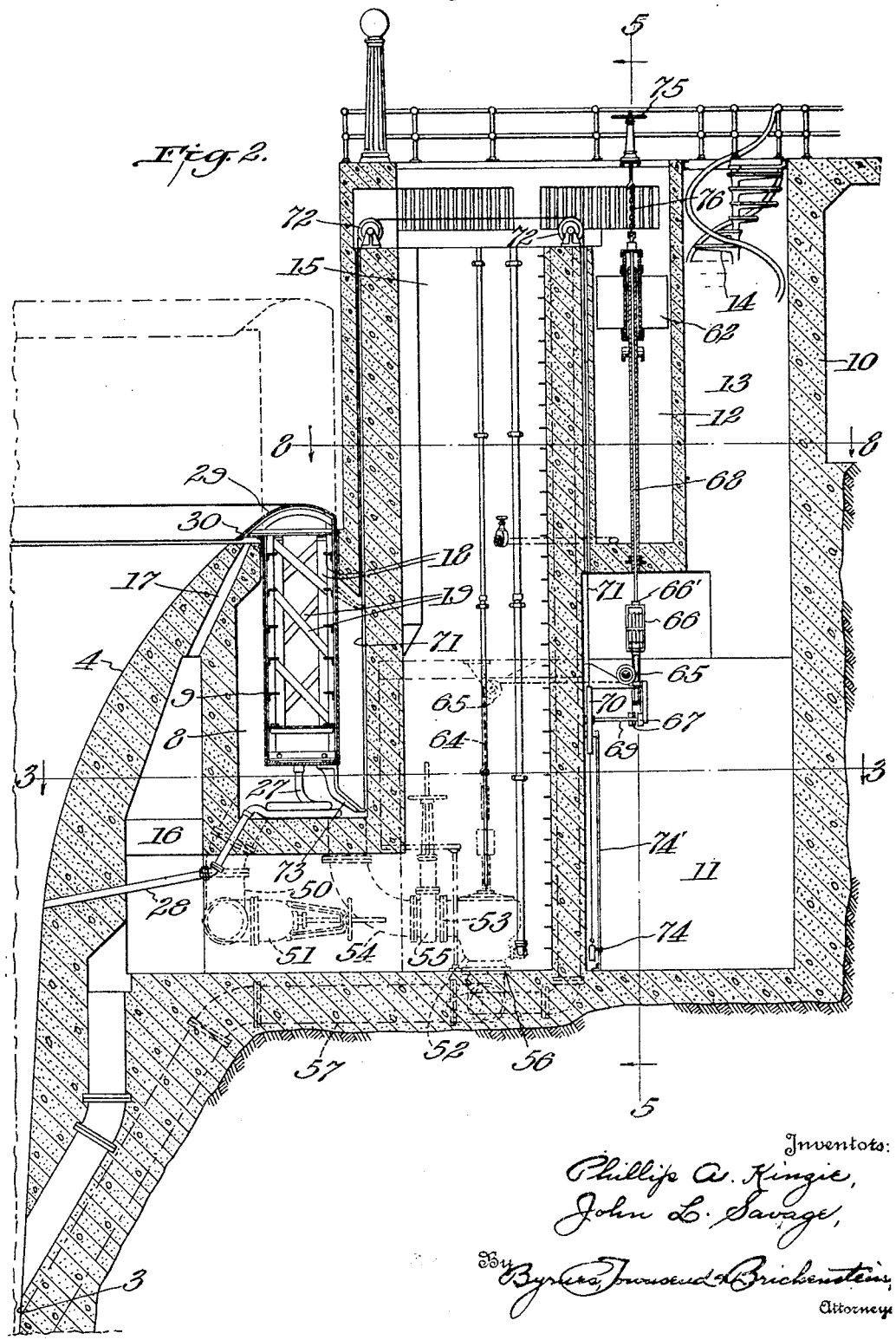

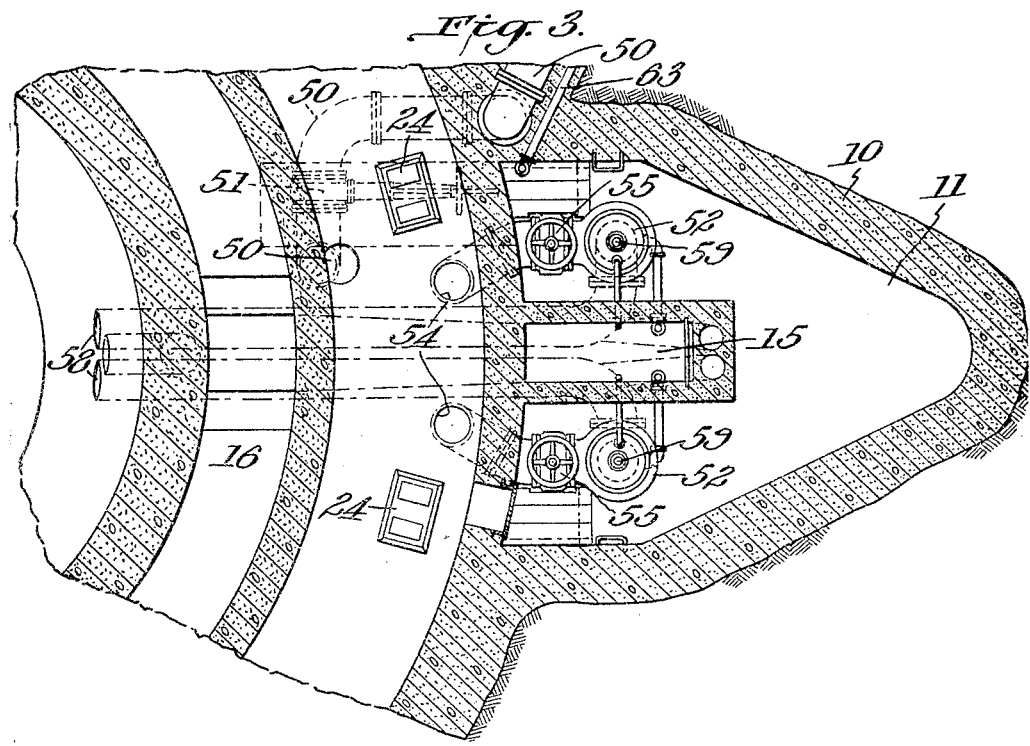
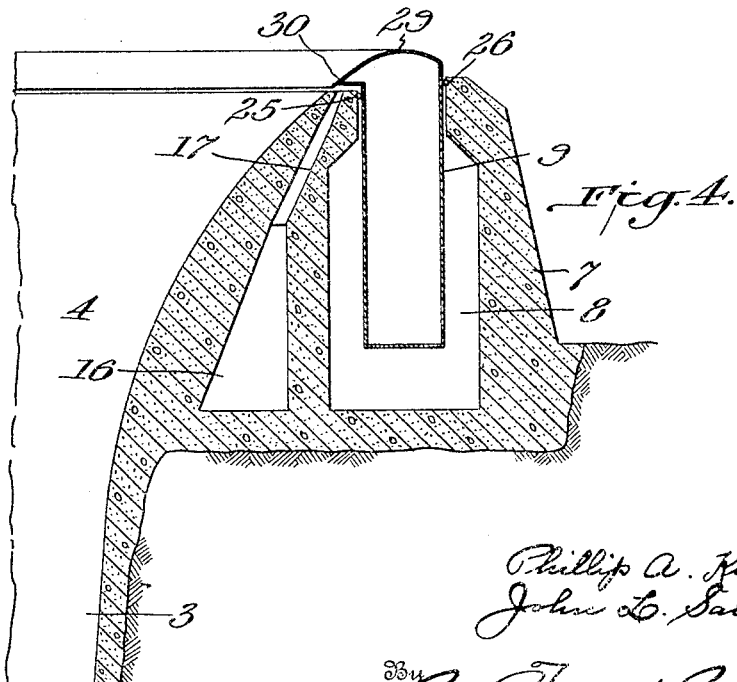

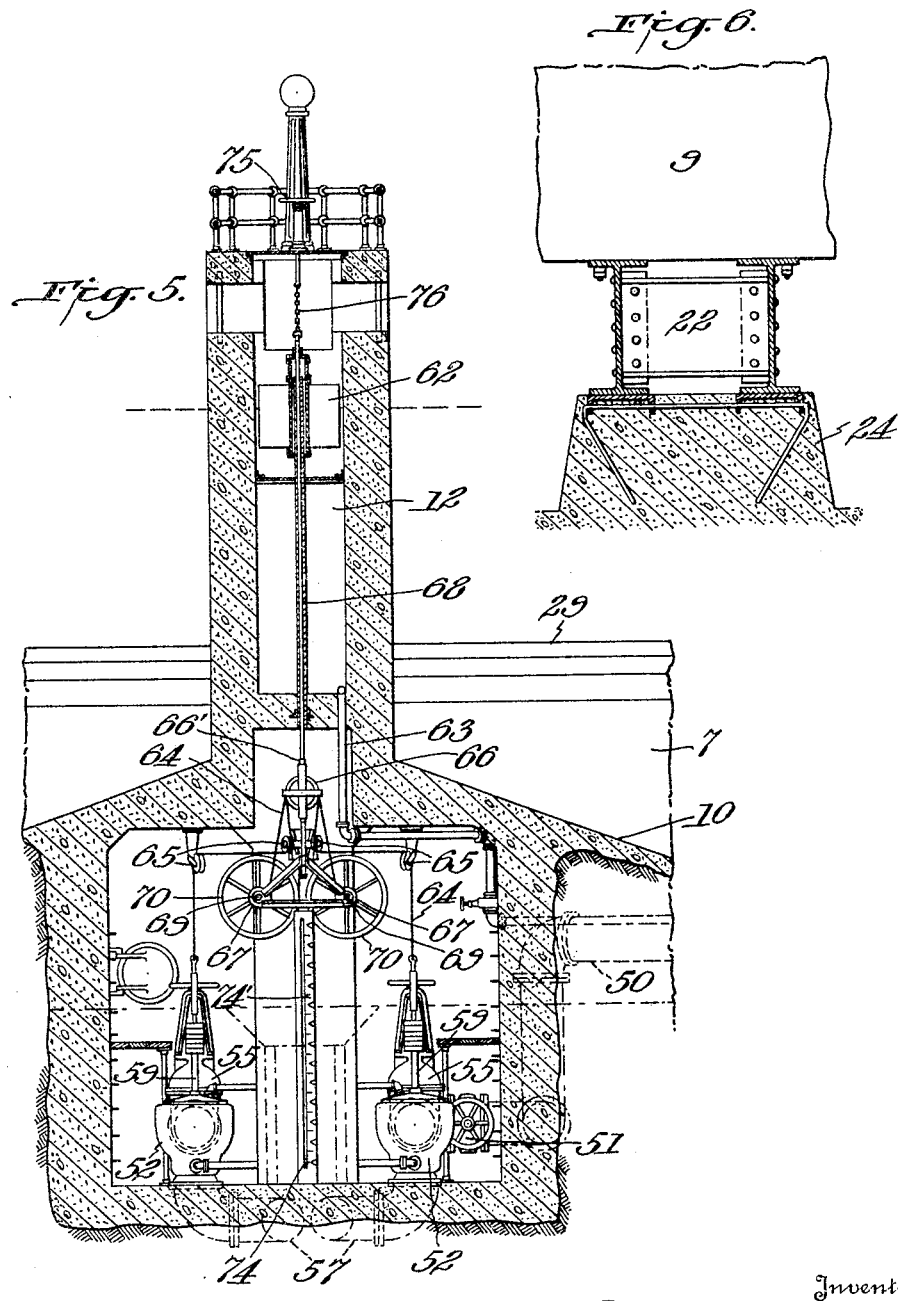

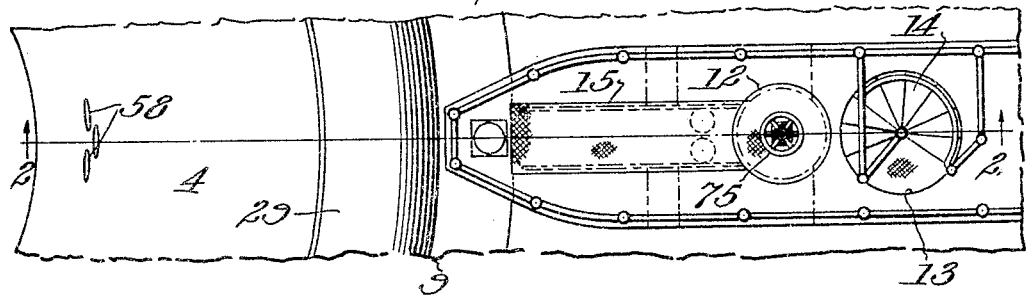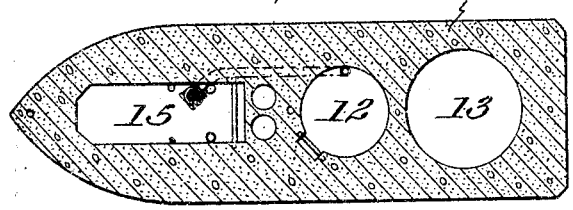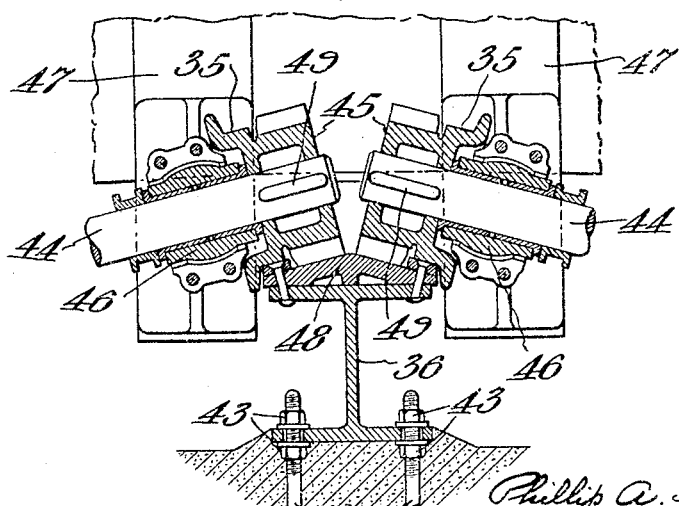

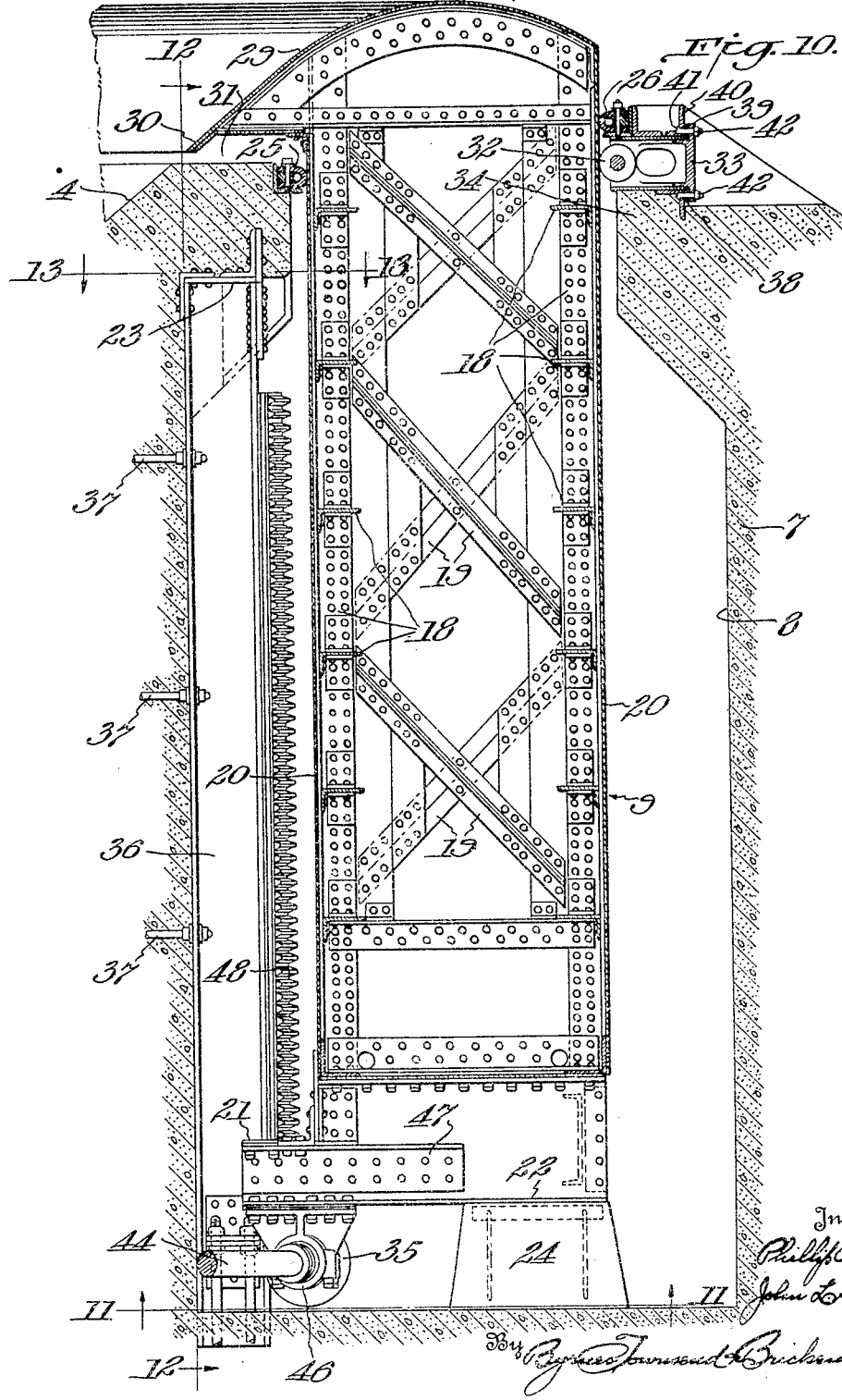

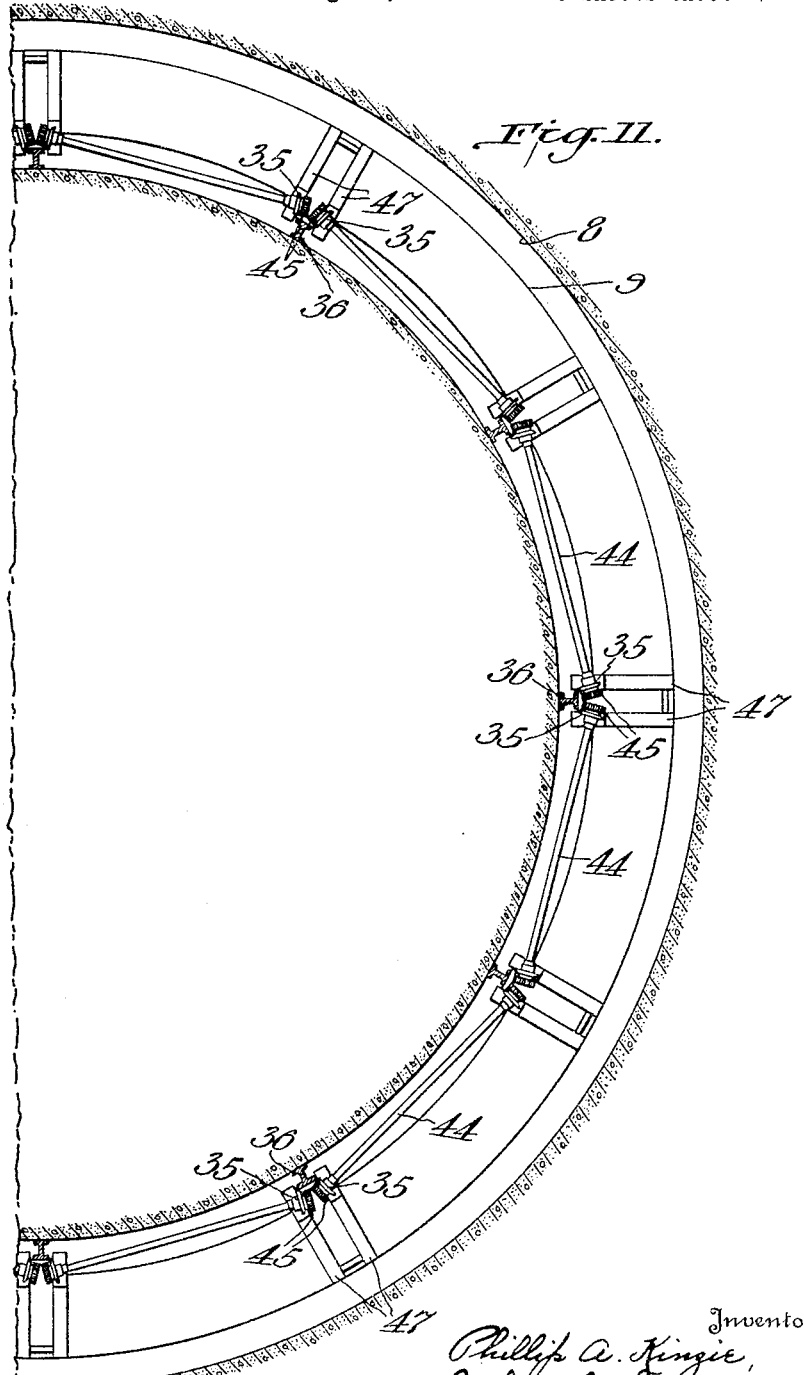

Jan. 5, 1932.   P. A. KINZIE ET AL   1,840,205
FLUID HANDLING AND CONTROLLING APPARATUS
Filed Aug. 11, 1928   9 Sheets-Sheet 8
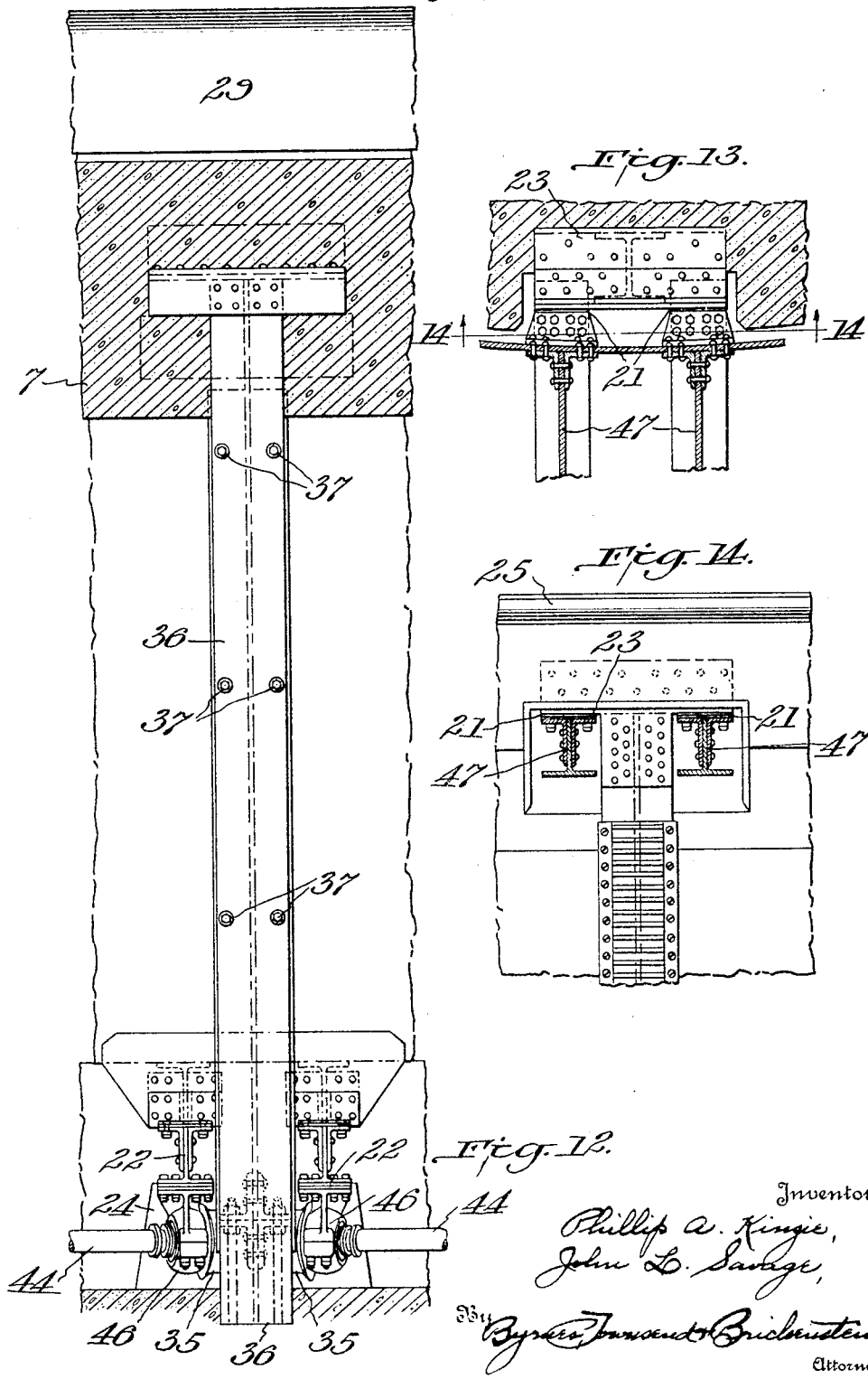

Jan. 5, 1932.  P. A. KINZIE ET AL  1,840,205
FLUID HANDLING AND CONTROLLING APPARATUS
Filed Aug. 11, 1928   9 Sheets-Sheet 9
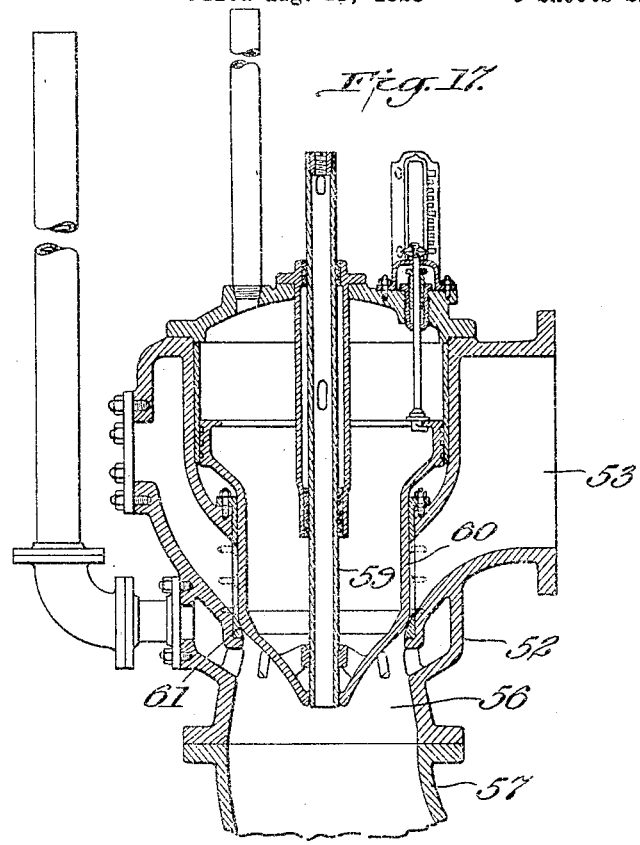
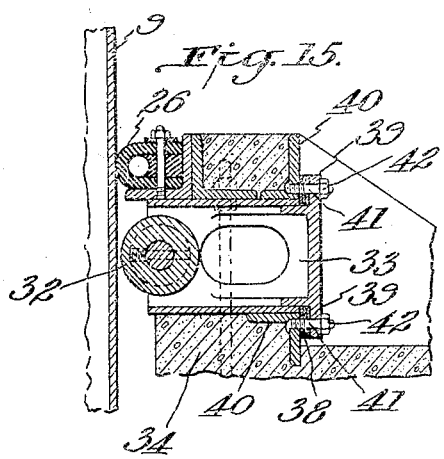
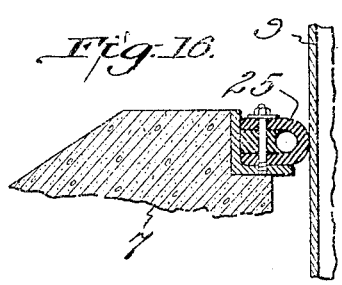
Inventors:
Phillip A. Kinzie,
John L. Savage,
By Byrnes, Townsend & Brickenstein
Attorneys Patented Jan. 5, 1932

1,840,205

UNITED STATES PATENT OFFICE

PHILLIP A. KINZIE AND JOHN L. SAVAGE, OF DENVER, COLORADO, ASSIGNORS TO UNIVERSAL HYDRAULIC CORPORATION, OF DENVER, COLORADO, A CORPORATION OF COLORADO

FLUID HANDLING AND CONTROLLING APPARATUS

Application filed August 11, 1928. Serial No. 298,962.

This invention relates, broadly, to hydraulic engineering, and, particularly, to a device which, for purposes of explanation, we will call a floating ring gate designed, primarily, for use in the control, regulation and release of large quantities of water such, for example, as are used for irrigation, power, and similar purposes. The gate of our invention may, moreover, serve as an automatic spillway gate whereby the surface level of water in a reservoir or the like may be automatically maintained at a predetermined constant elevation.

The principal advantages of gates constructed in accordance with our invention, as compared with those now known and used, are their increased hydraulic efficiency, the relatively small space required for the complete gate structure, due to the compactness of its design, their adaptability to automatic control, and the relatively low cost of a complete spillway structure as compared with the cost of spillways in which other known types of overflow gates are employed.

The invention consists, broadly, in a device for handling and controlling fluids, primarily water, including a buoyant gate member preferably of annular formation and through the axis of which the fluid may flow, the gate being movable vertically to vary the height of its lip or crest, and in means for automatically controlling such movement in response to fluctuations in the flow of fluid. The invention consists, further, in various structural features and arrangements of parts, as we will proceed now to explain and finally claim.

In the accompanying drawings, illustrating the invention, in the several figures of which like parts are similarly designated.

Fig. 1 is a diagrammatic sectional view of a typical reservoir and spillway embodying the device of our invention.

Fig. 2 is an enlarged vertical section, taken substantially on the line 2—2 of Fig. 7, and illustrating the gate pier and well construction, and the control devices mounted therein.

Fig. 3 is a section taken substantially on the line 3—3 of Fig. 2, certain parts being omitted in the interest of clearness.

Fig. 4 is a view on a smaller scale illustrating somewhat diagrammatically the appearance of a radial section of the gate well and associated air-duct chamber at a point removed from that of the section shown in Fig. 2.

Fig. 5 is a section taken substantially on the line 5—5 of Fig. 2.

Fig. 6 is an enlarged sectional detail of one of the pedestals which limit downward movement of the gate, the cooperating stop member of the gate being shown in contact therewith.

Fig. 7 is a fragmentary top plan view of the pier and associated parts shown in Fig. 2.

Fig. 8 is a section taken on line 8—8 of Fig. 2, parts being omitted.

Fig. 9 is a greatly enlarged sectional detail of one set of the gate stabilizing, leveling or movement compensating members.

Fig. 10 is an enlarged sectional detail of the gate and gate well and associated mechanism.

Fig. 11 is a section, on a reduced scale, taken substantially on the line 11—11 of Fig. 10.

Fig. 12 is a section taken substantially on the line 12—12 of Fig. 10.

Fig. 13 is a fragmentary section taken substantially on the line 13—13 of Fig. 10.

Fig. 14 is a section taken on line 14—14 of Fig. 13.

Fig. 15 is an enlarged sectional detail of the sealing members of the gate well and the guide roller shown in Fig. 10.

Fig. 16 is a detail similar to Fig. 15 but taken at a point in the gate well intermediate the rack carrying guides.

Fig. 17 is a central vertical section of one of the control valves for regulating the level of water in the gate well.

As illustrated in Fig. 1, our invention is applied to the spillway of a reservoir 1 in which the water is held by an appropriate dam 2.

The type of spillway to which the ring gate of our invention is best adapted consists of a vertical shaft 3, flaring at its upper end, as shown at 4, to conform to the hydraulic conditions governing the maximum quantity of water to be discharged. This spillway joins a tunnel 5, of suitable size, having an outlet 6 for discharging below the dam 2. Obviously, the spillway will be so located as to employ the local topography to the best advantage.

At the flared portion 4 of the shaft 3 we erect a concrete structure 7, preferably circular in plan, as is also the adjacent portion of the shaft, and in this structure we form a gate chamber 8 in which the ring gate 9 operates, as will be hereinafter more fully described.

A concrete pier 10 is constructed with its longitudinal center radial to the vertical axis of the shaft 3 and gate 9. This pier is so formed as to provide an operating chamber 11, a float chamber 12, a stair well 13 provided with a spiral stairway 14, (Fig. 2) and a shaft 15 forming an air inlet to the air duct 16 which surrounds the gate chamber and with which the gate chamber is in communication through a plurality of vent pipes or openings 17 (Figs. 2 and 4). This pier is of streamline formation, as shown in Fig. 8, and its presence causes the water to flow over the gate into the spillway in lines converging radially to the central axis of the gate 9 and shaft 3 and prevents the formation of a spiral current crossing the gate crest and of a whirlpool or vortex in the shaft, which might otherwise occur.

The ring gate proper (Figs. 2 and 10) is a hollow structure having a framework formed of structural steel members 18 and lateral or cross braces 19. This framework is made in appropriate segmental sections for convenience in shipping and erection and when assembled forms a truly cylindrical ring. This assembled framework is covered with a skin of water-tight plates 20 to form a buoyant structure and is arranged to float in the gate chamber 8, as will be later described.

The gate is provided with a plurality of stops 21 and 22 which are adapted to strike against abutments 23 and pedestals 24, respectively (Figs. 3, 6, 10, 13 and 14), to limit its upward and downward movement within the well 8, and is provided also with a leveling or compensating mechanism, hereinafter more fully explained, to insure the gate remaining in a truly horizontal position during its full travel irrespective of any unbalanced load that may be caused by ice, logs or other floating débris lodging upon or against it at any point.

Sealing members 25 and 26 at the upper inside and outside peripheries of the gate well, respectively, (Figs. 10, 15 and 16) and in contact with the inner and outer vertical surfaces of the gate prevent the entrance into and escape of water from the gate chamber, thus insuring proper functioning of the gate at all times.

The pressures of water against those portions of the inner and outer vertical surfaces of the gate which are within the gate chamber are balanced, and, as the gate is annular in shape and has a strong interior framework, it will be rigid against any water pressure acting upon those portions of its surfaces which may be exposed above the upper rim of the concrete structure within which the gate chamber is formed.

To prevent accumulation within the gate proper of water which may leak through the joints of the plates 20 forming the skin thereof, we provide a plurality of drain connections in or adjacent to its bottom. These drain connections may be flexible hose, as shown at 27, Fig. 2, or they may be composed of sections of pipe provided with swivel or other flexible joints to allow for full vertical travel of the gate. In either case connection is made with outlets 28 (Fig. 2) which lead from the floor of the gate chamber to the shaft 3.

The top portion of the gate is curved, as indicated at 29, to provide proper hydraulic conditions of flow, and extends beyond the inner vertical wall of the gate to form a lip or eave 30 which tends to direct the flow of water into the flared portion 4 of shaft 3. The vent pipes or openings 17 which connect with the air duct 16 admit air to the space 31 beneath the eave 30 when water is flowing over the gate.

The ring gate is guided in its vertical travel by a set of guide rollers 32 uniformly spaced around its outer circumference and carried by bearing boxes 33 mounted in the outer lip 34 of the gate chamber 8 (Figs. 10 and 15), and by another set of rollers 35 (Figs. 9, 10, 11 and 12) carried at the bottom inner circumference of the gate. These rollers 35 bear in rolling contact against vertical guides 36 adjustably mounted in the gate well 8 and anchored to its wall by anchor bolts 37. Adjustment of the rollers 32 relatively to the outer wall of the gate chamber, and hence to the gate, is provided for by means of shims 38 (Fig. 15) interposed between the flanges 39 or bearing boxes 33 and the supporting and guiding members 40, the boxes 33 with their rollers 32 being fixed in adjusted position by means of bolts 41 and nuts 42. Adjustment of the guides 36 relatively to the inner wall of the gate chamber, and hence to the rollers 35 carried by the gate, is provided for by means of adjustable pairs of nuts 43 (Fig. 9) on the threaded ends of the anchor bolts 37 engaging the opposite faces of the attaching flanges of the guides 36.

In order to stabilize the vertical movement of the gate and to compensate for loads on the top of the gate caused by accumulation of ice or débris, as hereinbefore mentioned, and to insure that, throughout vertical movement of the gate, its top will maintain a truly horizontal position, we provide a leveling device composed of a plurality of cooperating interacting members (Figs. 9, 10, 11, 12 and 14), comprising a series of horizontally arranged shafts 44 each of which carries at each end a pinion 45. The shafts 44 are carried in self-aligning bearings 46 mounted on structural members 47 rigidly attached to the gate structure and having applied to them also the lamellar, adjustable stop members 21 which limit the upward travel of the gate. The pinions 45 mesh with the teeth of racks 48 rigidly fastened to the guides 36. We prefer to form the rollers 35 and pinions 45 as integral structures, the rollers being flanged so as to bear both in gate-guiding and gate-rotation preventing contact against the guide members 36. As indicated at 49 in Fig. 9, the integral rollers 35 and pinions 45 are keyed to the ends of the shafts 44, and thus a continuous connection between the gate and the fixed guides 36 is provided circumferentially of the gate. It is this continuous connection that makes it impossible for any load on the top of the gate to cause the gate to float out of alignment for the reason that any tendency to tipping movement will be distributed, through the shafts 44, pinions 45 and fixed racks 48, around the circumference of the gate, and the horizontal alignment of its top maintained. For example, rotation in one direction of the pinions 45, below the point where the load occurs, will be restricted by rotation in the opposite direction of the pinions on the diametrically opposite portion of the gate, and hence, due to this compensating action, the top of the gate must always remain in a truly horizontal position.

Mechanism for controlling the operation of the ring gate automatically, and also manually, is illustrated in Figs. 2, 3, 5, 7, 8 and 17. The gate chamber 8 is in communication with the reservoir 1 through a conduit 50 provided with a valve 51. This conduit may be located at any point in the structure 7, but we prefer to so locate it that the valve 51 may lie within the operating chamber 11, which, as shown in Figs. 3 and 5, extends toward the shaft 3 at the sides of the air shaft 15. By proper manipulation of valve 51 the quantity of water admitted to the gate chamber may be so regulated as to be slightly in excess of that leaking past the sealing member 25, thus providing buoyancy and the water pressure against the bottom of the ring gate as forces to raise the gate.

The control apparatus comprises, among other elements, a control valve 52 (see particularly Figs. 2 and 17) having its inlet 53 connected to the gate chamber 8 by means of a pipe 54 provided with a valve 55, whereby it may be isolated from the gate chamber for purposes of inspection and repair without lowering of the water in the reservoir. Only one control valve is necessary for control of the gate, but we prefer an installation with two such valves, as shown, so that in case one fails in operation the gate may be controlled by the other and the first removed and repaired or replaced without any cessation of the functions of the gate.

This control valve forms the subject of our copending application filed August 11, 1928, Serial No. 298,961, and will therefore be only so far described herein as is necessary to make its functions obvious.

Control valve 52 discharges at 56 into a conduit 57 which empties into the shaft 3 at 58, Fig. 3, or at any other lower outlet which is open to atmospheric pressure.

The purpose of the control apparatus, in the embodiment of our invention shown in the drawings, is to so automatically control the operation of the ring gate that when the inflow of water to the reservoir decreases, the gate will rise, and when the inflow increases, the gate will lower, thus maintaining a practically constant level of water in the reservoir. In order to accomplish this purpose, the control element 59 which forms a part of the control valve 52 and serves, by the establishing of varying pressures within the valve, to adjust the effective clearance between the valve proper 60 and its seat 61, is connected, as will be later explained, to a float 62 which rides upon a body of water within the float chamber 12. The float chamber 12 is connected through a pipe 63 (Fig. 5) with the reservoir 1 so that the level of the body of water in the chamber 12 will at all times be the same as the level of the water in the reservoir. The connection between the element 59 and the float 62 is formed by a flexible cable 64 (Fig. 5) which passes over two fixed sheaves 65 and then over a floating sheave 66 from which it passes to and around a drum 67 to which it is attached. The floating sheave 66 is adjustably connected at 66' to the lower end of a stem 68 which is in turn connected to the float 62. The drum 67 is carried by and turns with a shaft 69 upon which is fixed a large sheave 70. A flexible cable 71 is connected to sheave 70, passes upward over two idler sheaves 72, and then downward and is fixed to an arm 73 carried at the bottom of the ring gate 9.

With this control apparatus the movements of the ring gate are controlled in such a manner that the level of the water in the reservoir remains practically constant regardless of the quantity of water flowing into the reservoir.

The operation of the apparatus is as follows:

Assume that the ring gate has risen to its highest position, as determined by the stops 21—23, under the influence of water gradually admitted to the gate chamber 8 through conduit 50, and that all control apparatus is properly installed. With the gate in this position, the valve 51 is so adjusted that it is from five to ten percent open. Valve 55 is then opened, permitting water from the gate chamber 8 to pass into the control valve 52 which is closed. By means of the adjusting member 66' the control element 59 in control valve 52 is raised. This permits water entering the valve from the gate chamber through conduit 54 to be discharged through conduit 57, thus lowering the pressure of water under the ring gate until the gate starts moving downward in the chamber 8. The adjustment at 66' is then slowly reversed until the gate slowly rises to its original position, the control valve 52 permitting the discharge from the gate chamber of only enough water to exactly balance the upward forces on the ring gate. With this adjustment the gate is in a balanced condition and will operate automatically.

With the gate in its highest position, we will now assume that there is an increase in the flow of water into the reservoir tending to raise the water level therein. The rise of the water level in the reservoir will be reflected in a similar rise in the float chamber 12. This causes the float 62 to rise, thus raising the movable element 59 in control valve 52 and thereby increasing the rate of discharge of water from the gate chamber 8 through conduits 54 and 57, and lowering the pressure under the ring gate. This causes the ring gate to descend and increases the discharge of water from the reservoir through the spillway. When this discharge of water through the spillway has caused the water level in the reservoir to drop to its original position the float 62 will also drop correspondingly and the movable element 59 will be lowered to decrease the discharge from the gate chamber, thus again balancing the pressures effective on the ring gate so that the gate will remain in its new lowered position until there is a further change in flow of water into the reservoir with its concomittant effect upon the reservoir water level.

Conversely, if the inflow of water to the reservoir decreases, there is a tendency for the water level to lower. This lowers the float 62, decreases the discharge from the gate chamber 8 through conduits 54 and 57 and control valve 52, and increases the pressure under the ring gate causing the gate to rise until the discharge over the gate is the same as the inflow to the reservoir. Thus the hydraulic conditions are again balanced and the gate remains stationary until there is a further change in inflow to the reservoir.

An indicator 74 cooperating with a suitable scale 74' and connected with the sheave 70 may be provided for indicating the various positions of the ring gate throughout its travel.

The movements of the gate can be manually as well as automatically controlled. Manual control is effected by means of a hand-wheel hoist 75 connected by a flexible cable or chain 76 with the stem 68, whereby the control element 59 of the valve 52 can be raised or lowered at will, thus increasing or decreasing the discharge from the gate chamber and lowering or raising the ring gate, as desired.

In addition to the use of the ring gate of our invention in such embodiments as herein shown and described, it may be employed as an intake or penstock gate, or to automatically maintain any desired water level in a reservoir or forebay, or to maintain any predetermined constant flow of water into a penstock.

Furthermore, the movements of the gate may be controlled from a distance by means of electrical or other means for operating the movable element 59 of the control valve 52.

In the embodiment of the invention herein disclosed we have described the flow of water as taking place in inwardly converging radial lines over the crest of the gate toward its center and thence downwardly through shaft 3 and out of tunnel 5, but it is to be understood that this direction of flow may be reversed, the water being led in a conduit from a reservoir to a vertical shaft around which the ring gate is positioned, and flowing thence upward and outward across the crest of the ring gate in radial outwardly diverging lines and escaping therefrom into a conduit or through any suitable channel surrounding the outer confines of the ring gate chamber.

It will thus be seen that we provide by our invention a device for handling and controlling the flow of fluids, such device being of relatively simple, compact and inexpensive construction, requiring materially less space, materials, and labor than any devices heretofore known of a similar character and constructed on a similar scale.

Moreover, we have provided means whereby the device of our invention may be adapted for either automatic or manually controlled operation to provide for the most effective handling of the fluid to be controlled and to adapt it to a variety of known uses.

While we have herein shown and described a specific embodiment of our invention in a ring gate for the spillway of a reservoir, it is to be understood that we do not consider it as limited thereto, it being conceivable that it is susceptible of a variety of embodiments and of changes in construction and arrangement of parts within the spirit of the invention and the scope of the following claims.

We claim:

1. In a fluid handling and controlling apparatus, a shaft arranged for the passage of fluid, a gate member surrounding said shaft and over the top of which the fluid flows, means providing a gate chamber in which the gate member is buoyantly supported, said gate member being movable axially of said shaft for controlling the flow of fluid therethrough over the top of the gate member in response to changes of fluid level and pressure in the gate chamber.

2. In a fluid handling and controlling apparatus, a shaft arranged for the passage of fluid, a buoyant gate member surrounding said shaft and over the upper portion of which said fluid flows, means providing a gate chamber to contain a body of fluid and in which said gate member is mounted for movement axially of said shaft, means for admitting fluid to and discharging fluid from said chamber to buoyantly support said gate member, and means for varying the level and pressure of the fluid in said chamber for the purpose of imparting movement to said gate member.

3. In a fluid handling and controlling apparatus, a shaft arranged for the passage of fluid, a buoyant gate member surrounding said shaft and over the upper portion of which said fluid flows, means providing a gate chamber to contain a body of fluid and in which said gate member is mounted for movement axially of said shaft, means for admitting fluid to and discharging fluid from said chamber to buoyantly support said gate member, and means for automatically varying the level and pressure of the fluid in said chamber for the purpose of imparting movement to said gate member.

4. In a fluid handling and controlling apparatus, a shaft arranged for the passage of fluid, a buoyant gate member surrounding said shaft and over the top of which said fluid flows, means providing a gate chamber surrounding said shaft and in which said gate member is mounted for movement axially of said shaft, said gate chamber being surrounded by a body of fluid, means for admitting fluid from said body of fluid to said gate chamber to establish a level and pressure of fluid therein to buoyantly support said gate member, and means for varying the level and pressure of the fluid thus admitted to said chamber for imparting movement to said gate member.

5. In a fluid handling and controlling apparatus, a shaft arranged for the passage of fluid, a buoyant gate member surrounding said shaft and over the top of which said fluid flows, means providing a gate chamber surrounding said shaft and in which said gate member is mounted for movement axially of said shaft, said gate chamber being surrounded by a body of fluid, means for admitting fluid from said body of fluid to said gate chamber to establish a level and pressure of fluid therein to buoyantly support said gate member, and means responsive to changes in level of the body of fluid for automatically varying the level and pressure of the fluid thus admitted to said chamber for imparting movement to said gate member.

6. In a fluid handling and controlling apparatus, the combination with a reservoir, and a spillway therefor including a vertical shaft, of a gate member comprising a buoyant cylindrical ring surrounding said shaft and over the top of which water flows through said shaft, a structure providing a gate chamber in which said gate member is mounted for vertical travel within predetermined limits, means forming a seal between the cylindrical surfaces of said gate member and said chamber, means for admitting water from said reservoir to said gate chamber to establish a body of water under pressure therein by which said gate member is buoyantly supported, and means for automatically discharging water from said gate chamber in response to variations in the flow of water into said reservoir, to automatically raise and lower said gate member and thereby maintain the level of water in said reservoir substantially constant regardless of the rate of flow of water into the reservoir.

7. In a fluid handling and controlling apparatus, the combination with a reservoir, and a spillway therefor including a vertical shaft, of a gate member comprising a buoyant cylindrical ring surrounding said shaft and over the top of which water flows through said shaft, a structure providing a gate chamber in which said gate member is mounted for vertical travel within predetermined limits, means forming a seal between the cylindrical surfaces of said gate member and said chamber, means for admitting water from said reservoir to said gate chamber to establish a body of water under pressure therein by which said gate member is buoyantly supported, and means for automatically discharging water from said gate chamber in response to variations in the flow of water into said reservoir, to automatically raise and lower said gate member and thereby maintain the level of water in said reservoir substantially constant regardless of the rate of flow of water into the reservoir, said last mentioned means being capable of adjustment to so control the movements of the gate member that the level of the water in the reservoir may be maintained at any predetermined elevation substantially within the limits of movement of the top of the gate member.

8. In a fluid handling and controlling apparatus, the combination with a reservoir, and a spillway therefor including a vertical shaft, of a gate member surrounding said shaft and movable axially thereof for the purpose of controlling the flow of water from said reservoir through said spillway, and a pier construction so arranged relatively to said spillway as to prevent the formation therein of a vortex in the water flowing therethrough.

9. In a fluid handling and controlling apparatus, a vertical shaft arranged for the passage of a fluid, a hollow buoyant ring-shaped gate member surrounding said shaft and axially movable relatively thereto and over the top of which the fluid flows, a structure providing an annular gate chamber in which said gate member is movable, and cooperating means including means arranged in said chamber and means on said gate, whereby the top of said gate will be caused to remain in truly horizontal position regardless of weight unevenly distributed thereon.

10. In a fluid handling and controlling apparatus, a vertical shaft arranged for the passage of a fluid, a ring-shaped gate member surrounding said shaft and axially movable relatively thereto and over the top of which the fluid flows, a structure providing an annular gate chamber in which said gate member is movable, and cooperating means including interacting gearing in said chamber and on said gate, whereby the top of said gate will be caused to remain in truly horizontal position regardless of weight unevenly distributed thereon.

11. In a fluid handling and controlling apparatus, a vertical shaft arranged for the passage of a fluid, a ring-shaped gate member surrounding said shaft and axially movable relatively thereto and over the top of which the fluid flows, a structure providing an annular gate chamber in which said gate member is movable, a plurality of guides vertically disposed within said chamber, toothed racks carried by said guides, and a plurality of shafts disposed around said gate member and provided with gears adapted to intermesh with said racks, the intermeshing of said gears and racks around the circumference of said gate member serving to provide means whereby the top of the gate will be caused to remain in truly horizontal position regardless of weight unevenly distributed thereon.

12. In a fluid handling and controlling apparatus, a vertical shaft arranged for the passage of a fluid, a ring-shaped gate member surrounding said shaft and axially movable relatively thereto and over the top of which the fluid flows, a structure providing an annular gate chamber in which said gate member is movable, a plurality of guides vertically disposed within said chamber, toothed racks carried by said guides, and a plurality of shafts disposed around said gate member and provided with gears adapted to intermesh with said racks, the intermeshing of said gears and racks around the circumference of said gate member serving to provide means whereby the top of the gate will be caused to remain in truly horizontal position regardless of weight unevenly distributed thereon, and means carried by said gate member and cooperating with said guides for preventing rotation of said gate member within said chamber.

In testimony whereof, we affix our signatures.

PHILLIP A. KINZIE.
JOHN L. SAVAGE.